United States Patent
Dao et al.

(10) Patent No.: US 11,681,826 B2
(45) Date of Patent: Jun. 20, 2023

(54) SYSTEMS AND METHODS FOR PROTECTION OF DATA ACROSS MULTIPLE USERS AND DEVICES

(71) Applicant: JPMORGAN CHASE BANK, N.A., New York, NY (US)

(72) Inventors: Tuan Dao, Richardson, TX (US); Howard Spector, Woolwich, NJ (US); Jeremy F. Bennett, San Carlos, CA (US); Rod Bachelor, San Carlos, CA (US); Pavan Mummareddi, Newark, DE (US); Ralph Darmo, West Chester, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 108 days.

(21) Appl. No.: 17/109,001

(22) Filed: Dec. 1, 2020

(65) Prior Publication Data

US 2021/0173960 A1      Jun. 10, 2021

Related U.S. Application Data

(60) Provisional application No. 62/944,244, filed on Dec. 5, 2019.

(51) Int. Cl.
*G06F 21/62*         (2013.01)
*G06F 21/60*         (2013.01)

(52) U.S. Cl.
CPC ........ *G06F 21/6263* (2013.01); *G06F 21/602* (2013.01)

(58) Field of Classification Search
CPC ............... G06F 21/6263; G06F 21/602; G06F 21/6218; H04W 12/08; H04W 12/71; H04W 12/02; H04L 63/101; H04L 63/104
See application file for complete search history.

(56) References Cited

U.S. PATENT DOCUMENTS

| 2004/0117371 | A1* | 6/2004 | Bhide ................. G06F 21/6218 |
| | | | 707/999.009 |
| 2011/0060777 | A1* | 3/2011 | Van De Poel ........ G06F 16/639 |
| | | | 707/827 |

(Continued)

OTHER PUBLICATIONS

International Search Report, dated May 3, 2021, from corresponding International Application No. PCT/US2020/063413.

(Continued)

*Primary Examiner* — Philip J Chea
*Assistant Examiner* — Sangseok Park
(74) *Attorney, Agent, or Firm* — Greenberg Traurig LLP (57) ABSTRACT

Systems and methods for protection of data across multiple users and devices are disclosed. According to one embodiment, in privacy server comprising at least one computer processor, a method for protection of data across multiple users and devices may include: (1) receiving, from a first user device, a data sharing permission for the first user device and a data sharing permission for a second user device, the first user device and the second user device associated with the same user; (2) provisioning the data sharing permission for the second user device; and (3) communicating the provisioned data sharing permission to the second user device, wherein the second user device shares data with the first user device according to the provisioned data sharing permission.

18 Claims, 6 Drawing Sheets

(56) References Cited

U.S. PATENT DOCUMENTS

| | | | |
|---|---|---|---|
| 2013/0067564 A1* | 3/2013 | Fok Ah Chuen ... | G06F 21/6218 726/17 |
| 2014/0122885 A1* | 5/2014 | Wu ................. | H04L 67/1097 713/150 |
| 2014/0357269 A1* | 12/2014 | Zhou ................ | H04W 76/14 455/434 |
| 2015/0358406 A1 | 12/2015 | Scheer et al. | |
| 2018/0007099 A1* | 1/2018 | Ein-Gil ............ | H04L 65/403 |
| 2019/0311055 A1* | 10/2019 | Vickrey ........... | G06F 21/6227 |
| 2021/0141888 A1* | 5/2021 | Hires ............... | H04L 63/083 |

OTHER PUBLICATIONS

Written Opinion of the International Searching Authority, dated May 3, 2021, from corresponding International Application No. PCT/US2020/063413.

\* cited by examiner

SYSTEMS AND METHODS FOR PROTECTION OF DATA ACROSS MULTIPLE USERS AND DEVICES

RELATED APPLICATIONS

This application claims priority to U.S. Provisional patent Application Ser. No. 62/944,244, filed Dec. 5, 2019, the disclosure of which is hereby incorporated, by reference, in its entirety.

BACKGROUND OF THE INVENTION

1. Field of the Invention

Embodiments generally relate to systems and methods for protection of data across multiple users and devices.

2. Description of the Related Art

A service provider generally has access to data coining from multiple sources, channels and partners. That creates an array of challenges in how data regarding the user's identity and devices that produce the personal data are handled, especially with regard to protecting the privacy of such data.

SUMMARY OF THE INVENTION

Systems and methods for protection of data across multiple users and devices are disclosed. According to one embodiment, in privacy server comprising at least one computer processor, a method for protection of data across multiple users and devices may include: (1) receiving, from a first user device, a data sharing permission for the first user device and a data sharing permission for a second user device, the first user device and the second user device associated with the same user; (2) provisioning the data sharing permission for the second user device; and (3) communicating the provisioned data sharing permission to the second user device, wherein the second user device shares data with the first user device according to the provisioned data sharing permission.

In one embodiment, the data sharing permission may identify a type of data to share.

In one embodiment, the type of data may include account data, activity data, preference data, etc.

In one embodiment, the first user device may be associated with a first device key and the second user device may be associated with a second device key, and the second device may be identified to the privacy server by the second device key.

In one embodiment, the method may further include receiving encrypted data from the first user device or the second user device; and storing the encrypted data in accordance with the data sharing permission.

In one embodiment, the method may further include communicating the encrypted data to the first user device or the second user device in accordance with the data sharing permission.

In one embodiment, the method may further include restoring the encrypted data to the same user device from which it originated.

According to another embodiment, in privacy server comprising at least one computer processor, a method for sharing data among devices associated with a plurality of users may include: (1) receiving, from a first privacy application executed on a first electronic device, registration for a first user, wherein the registration may include an identification of the first user device and an identification of a data owner for the data on the first user device; (2) receiving, from the first privacy application, data sharing preferences for the first user; (3) saving the data sharing preferences for the first user; (4) receiving, from a second privacy application executed on a second electronic device, registration for a second user, wherein the registration may include an identification of the second user device and an identification of a data owner for the data on the second user device; (5) receiving, from the first privacy application, a request for the second user to share data with the first user; (6) communicating the request to the second privacy application; (7) receiving, from the second privacy application, a response to the request, wherein the response approves or denies the request; (8) configuring data sharing permissions for the first device and the second device; and (9) communicating the data sharing permissions to the first privacy application and to the second privacy application, wherein at least one of the first privacy application and the second privacy application update data sharing permissions on the respective device.

In one embodiment, the request for the second user to share data with the first user may identify a type of data to share.

In one embodiment, the type of data may include account data, activity data, preference data, etc.

In one embodiment, the method may further include receiving encrypted data from the first user device or the second user device; and storing the encrypted data in accordance with the data sharing permissions.

In one embodiment, the method may further include communicating the encrypted data to the first user device or the second user device in accordance with the data sharing permissions.

According to another embodiment, in privacy server comprising at least one computer processor, a method for sharing data among devices associated with a plurality of users may include: (1) receiving, from a first privacy application executed on a first electronic device, registration for a first user, wherein the registration may include an identification of the first user device and an identification of a data owner for the data on the first user device; (2) receiving, from the first privacy application, data sharing preferences for the first user; (3) saving the data sharing preferences for the first user; (4) receiving, from a second privacy application executed on a second electronic device, registration for a second user, wherein the registration may include an identification of the second user device and an identification of a data owner for the data on the second user device; (5) receiving, from the second privacy application, a request for the second user to share data with the first user; (6) configuring data sharing permissions for the first device and the second device; and (7) communicating the data sharing permissions to the first privacy application and to the second privacy application, wherein at least one of the first privacy application and the second privacy application update data sharing permissions on the respective device.

In one embodiment, the request for the second user to share data with the first user may identify a type of data to share.

In one embodiment, the type of data may include account data, activity data, preference data, etc.

In one embodiment, the method may further include receiving encrypted data from the first user device or the second user device; and storing the encrypted data in accordance with the data sharing permissions.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for protection of data across multiple users and devices.

Embodiments may segment the user data in "Personal Data Spheres" that enable the aggregation of data from devices that the owner may use. Embodiments may include a permission system for each device that allows the user to set access permissions for the data. The personal data and permissions may be stored (e.g., as a copy) on each device and may be encrypted. The provider's server may act as a system of record and may store both permission settings and the encrypted data that belongs to the user for all owned devices.

In embodiments, the user's data may be encrypted with keys that are only known to the user; thus, the contents are protected from the provider's server.

In one embodiment, permissioning may allow for segmentation of data where different sharing (e.g., access) permissions may be set for different types of data.

Embodiments may provide some or all of the following: (1) data sharing and protection among multiple devices a user may own; (2) data sharing among multiple users (e.g. a family or a circle of related persons); (3) data protection at-rest and in-transit; (4) flexible protection for different level of data sensitivity; (5) flexible protection for different tiers of data sharing according to trust or relations of owner to other persons; (6) allowing data migration from on device to another or in case of data loss on device (data retrieval from server).

In embodiments, personal data (e.g., privacy data) is considered to be associated with a person, and may be aggregated from data from devices that the person may own and/or control. The owner of the data may have overriding authority to set permissions for what to be shared with any other entities or devices. The privacy service provider may retain the data and share the data strictly in accordance to data owner's permission settings.

Figure 1:
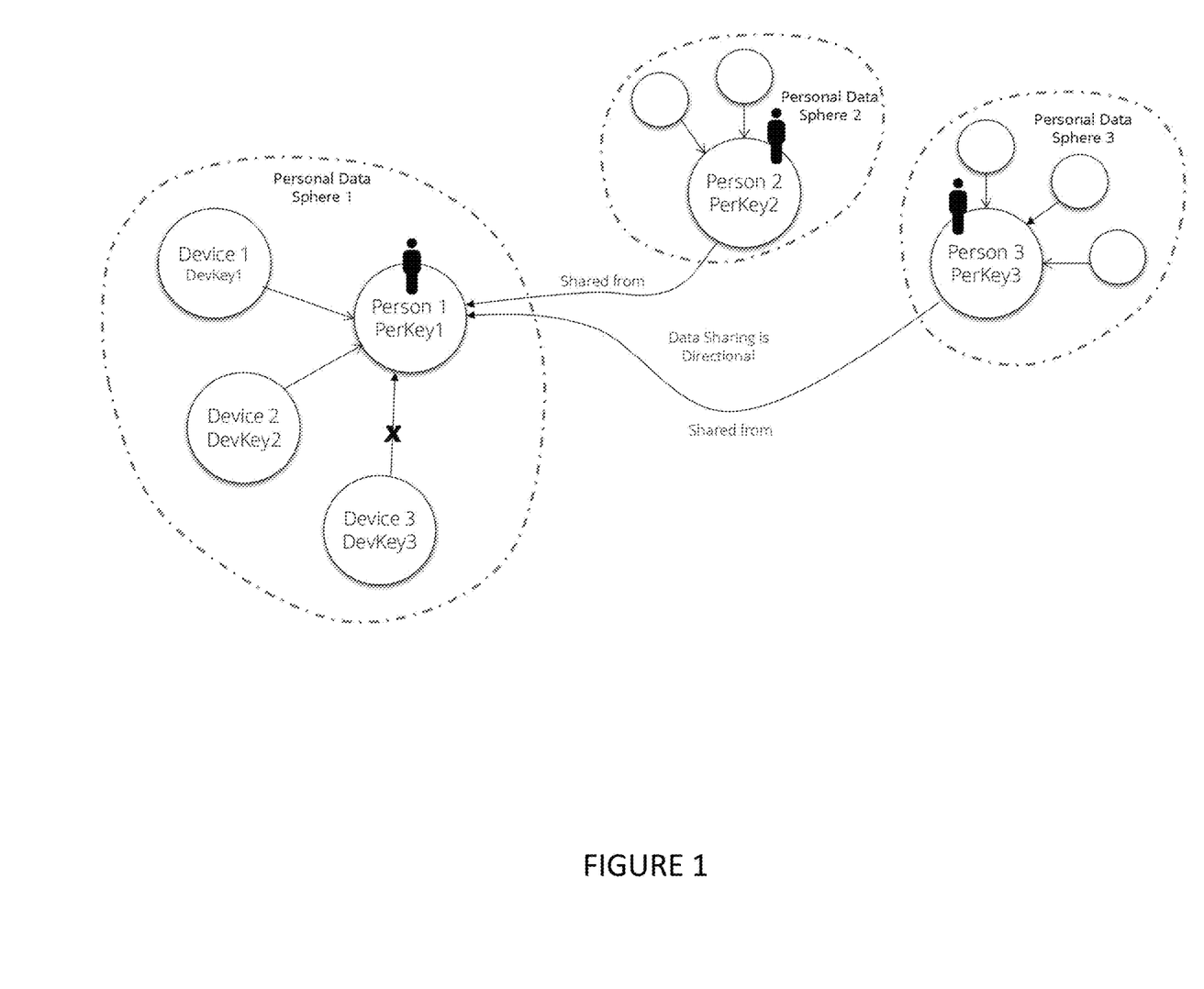
FIG. 1 depicts a system for protection of data across multiple users and devices according to one embodiment.

Referring to FIG. 1, an illustration of data spheres is provided according to one embodiment. FIG. 1 illustrates personal data for the Person 1 (the owner), which may be aggregated from a plurality of devices, such as Device 1 and Device 2. Even though Person 1 may own or control Device 3, the owner may choose not to aggregate the data from Device 3 (indicated by the "X").

Within each personal data sphere (e.g., the data sphere for Person 1, Person 2, Person 3, etc.), the owner of the data (e.g. Person 1, Person 2, Person 3) decides whether to aggregate each device's data and behaviors. Data on devices that is not aggregated may be analyzed on a standalone basis. Such analysis would not combine data on non-aggregated devices with data from any other devices, any other persons or any other sources.

Each person may have a key, such as PerKey1, PerKey2, PerKey3, and each device may have a key, such as DevKey1, DevKey2, DevKey 3.

Person 2 and Person 3 may also have a plurality of devices, and may aggregate data from their devices as illustrated. Across Personal Data spheres, e.g., Person 2 to Owner), data may be filtered but the source set is the aggregated set of all participating devices. The data owner may set sharing permissions, and such permissions may be directional (asymmetric). As illustrated, both Person 2 and Person 3 have chosen to share data with Person 1. By Person 2 giving permission to share data with Person 1, Person 1's data is not shared with Person 2 without separate permission from Person 1. Person 2 has not decided to share data with Person 3, and vice-versa.

Figure 2:
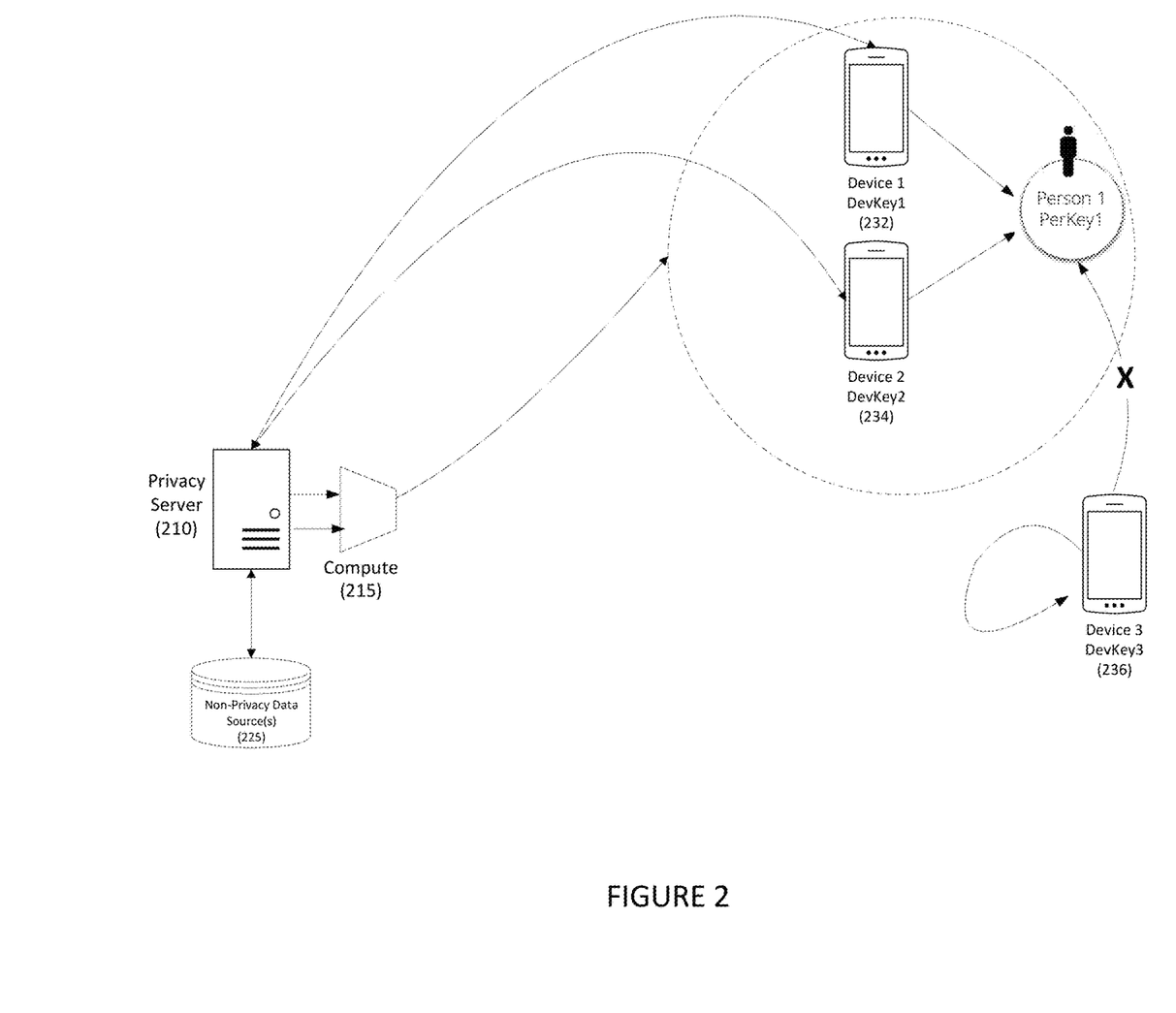
FIG. 2 depicts a person-level data view according to one embodiment.

FIG. 2 illustrates a person-level data view according to embodiments. The device sharing permission may pertain only to allowing data from particular device(s) (e.g., Device 1 232 and Device 2 234) to be shared with privacy server 210 for the purposes of computing a person-level data view using, for example, compute module 215. For any devices that the owner chooses to disable sharing (e.g., Device 3 236), data originated from those devices may not transit through privacy server 210. Any privacy reports and scoring for such a device (e.g., Device 3 236) may be computed locally on that device (e.g., Device 3 236). This means that information from other sharing-enabled devices (e.g., Device 1 232 and Device 2 234) belonging to the same owner and other non-privacy information are not part of such a computation.

In one embodiment, privacy server 210 may provide a separate cloud-based engine to compute analysis, reporting or scoring based on a data set a user chooses to submit for such computation. The user may instruct privacy server 210 whether to compute on the dataset stand-alone, combine the dataset or aggregate it with other data, and whether to persist or delete the dataset and computation results after computation.

In one embodiment, person-to-person sharing permission may pertain only to sharing of person-level aggregated data. This means data from a device (e.g., Device 3 236) that is not shared with privacy server 210 is not shared with another device (e.g., Device 1 232 or Device 2 234).

In one embodiment, privacy server 210 may ingest non-privacy data such as transaction history, financial profile, etc. from one or more non-privacy data source 225 to add intelligence to an algorithm executed by compute module 215.

For example, privacy server 210 may ingest data that may be used to facilitate commercial transactions based on intended user experiences. In another embodiment, compute module 215 may provide data that may be used to facilitate commercial transactions based on intended user experiences. The disclosures of U.S. Patent Application Ser. Nos. 62/833,417; 16/844,560; and 16/845,937 are hereby incorporated, by reference, in their entireties.

Figure 3:
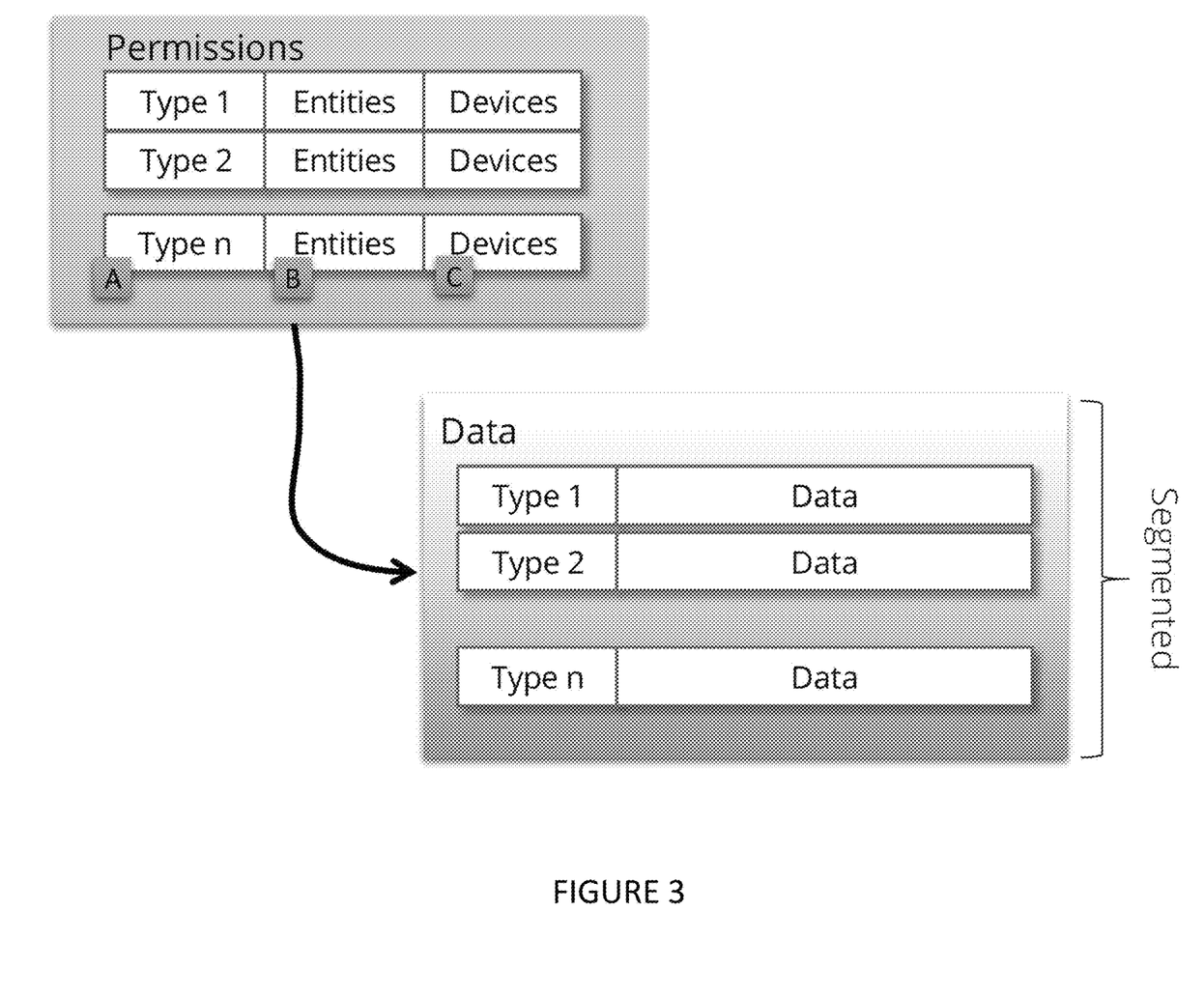
FIG. 3 depicts an exemplary device-level view according to one embodiment.

Referring to FIG. 3, an exemplary device-level view is provided according to one embodiment. Each device may include a set of permissions that may apply to different types of data (e.g., Type 1, Type 2, . . . Type n). Examples of different data types may include accounts (e.g., status, entitlements, permissions, etc.), activities (e.g., list of domains visited), and preferences (e.g., alerting, whitelisting, VPN, device fingerprint obfuscation, aliasing, scoring, etc.) on the device. These data types are exemplary only and different data types may be used as is necessary and/or desired.

Each data type (e.g., Type 1, Type 2, . . . Type n) may be further broken down to finer grain sub-types. For example, activities may be further broken down to activities applicable to a particular set of domains, such as a user may choose to share all data with the privacy server except for data associated a healthcare provider, the IRS, etc.

Entities may identify the owner (e.g. Person 1), the server (e.g., the privacy server), and a relations group, such as members of the same family. A relations group may be a user convenience feature that may be used to assign permissions to a group of entities of the same relations.

Devices may identify the devices with which the data may be shared, and may identify those devices by Device Key (e.g., DevKey1, DevKey2, etc.). Whatever data is shared from a device for person-level aggregated view may be accessible by other devices.

Any access to the data generally requires sufficient permissions.

Figure 4:
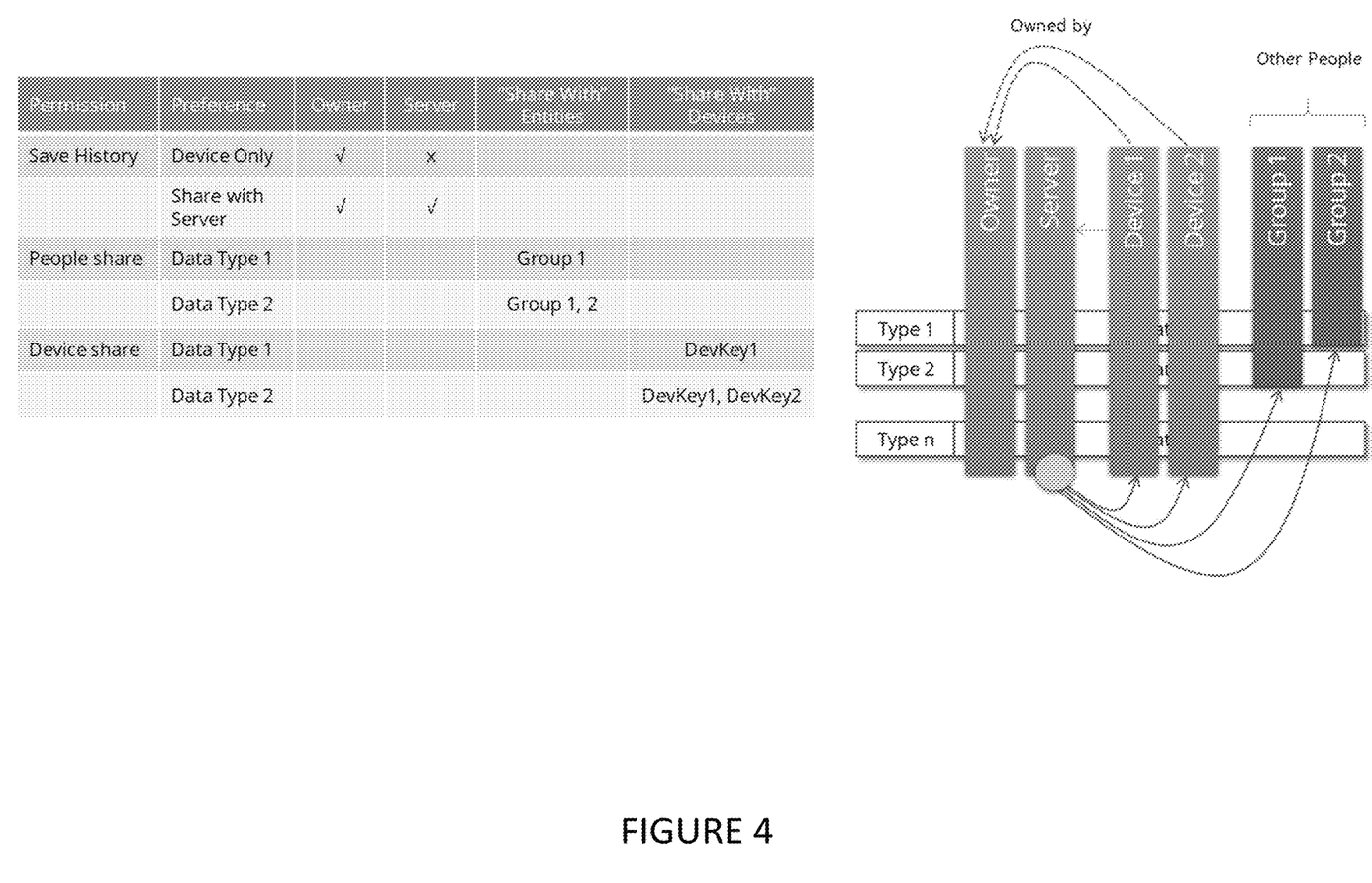
FIG. 4 depicts an illustration of sharing permission with groups according to one embodiment.

Referring to FIG. 4, an illustration of sharing permission with groups is provided according to one embodiment. In embodiments, any data that a user chooses to share must go through the privacy server. Thus, the user may be the sole entity that sets sharing permissions, and the privacy server may be the sole facilitator for data sharing based on permissions set by the user.

As illustrated, the owner may identify where the data is saved (e.g., server), what people to share the data with, and what devices to share the data with.

Figure 5:
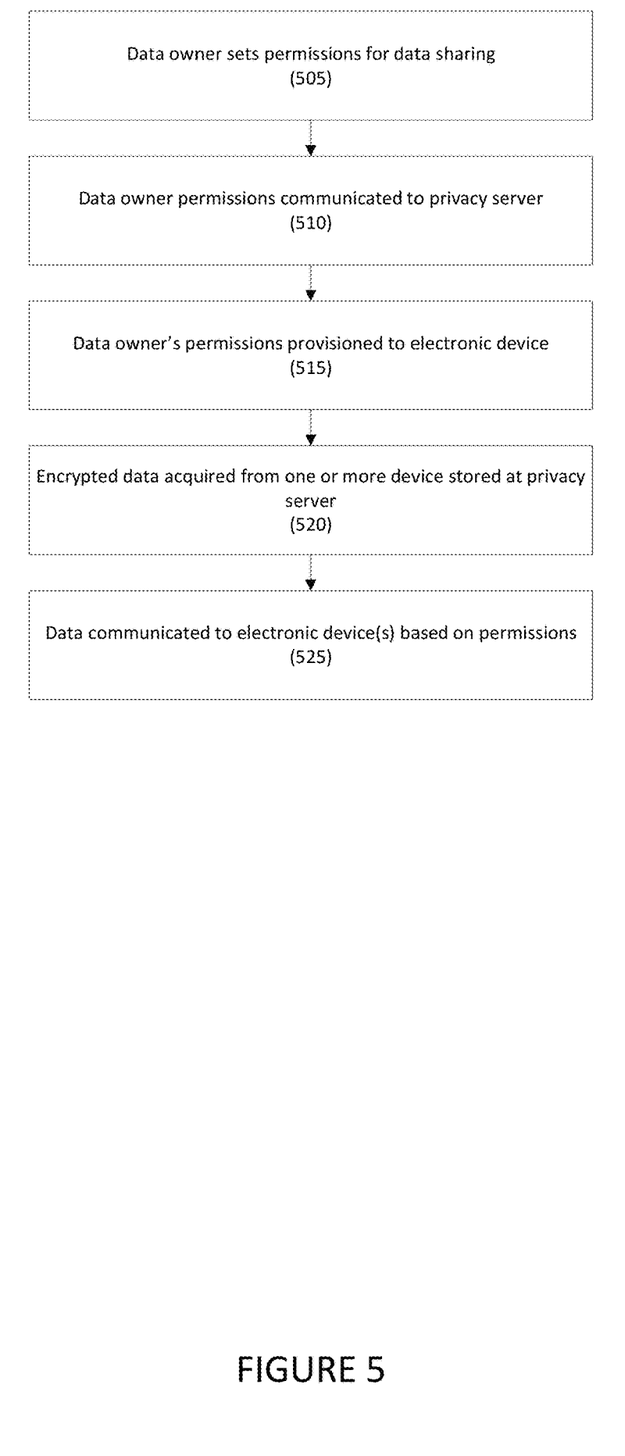
FIG. 5 depicts a method for setting up sharing permissions according to one embodiment.

Referring to FIG. 5, an exemplary method of setting up sharing permissions is disclosed according to an embodiment.

In step 505, a data owner may set permissions for data sharing, using, for example, a data privacy application or program executed on one of the data owner's electronic devices.

In step 510, the permissions may be communicated to the privacy server.

In step 515, the privacy server may configure the permissions for the electronic device(s) and may communicate the configured permissions to the relevant electronic devices. For example, if the data owner sets permissions for device 3 to share data with device 1, the privacy server would configure the permissions for devices and 1 and 3 and communicate the configured permissions to those devices. The privacy server may not communicate configured permissions to device 2 as there is no change for device 2.

In step 520, data from one or more data owner device may be acquired and stored at the privacy server. For example, if a user chooses to share data with the privacy server (e.g., for backup and aggregation purposes), the privacy server may persist such data which may be encrypted according to the sharing permission set by the data owner. The key for decryption may be generated and persisted only on the device, precluding the privacy server from seeing the content if the data owner chooses not to allow the privacy server to see the contents.

The keys may be stored in secure storage (e.g., keychain or EET) that is separate from other data storage in the privacy mobile app.

Account data (such as permissions) may be stored by the privacy server as the system-of-records, as this data is not privacy data.

Activities data (such as browsing history) may only be stored by the privacy server if the user chooses to do so. If stored on the server, the user may retrieve/restore the data in case of device changes or data accidental losses.

In step 525, the data may be transmitted from the privacy server to the device as is necessary and/or desired. For example, if the user needs to restore the data on the electronic device, the encrypted data may be migrated to the electronic device, decrypted, and store on the electronic device.

Figure 6:
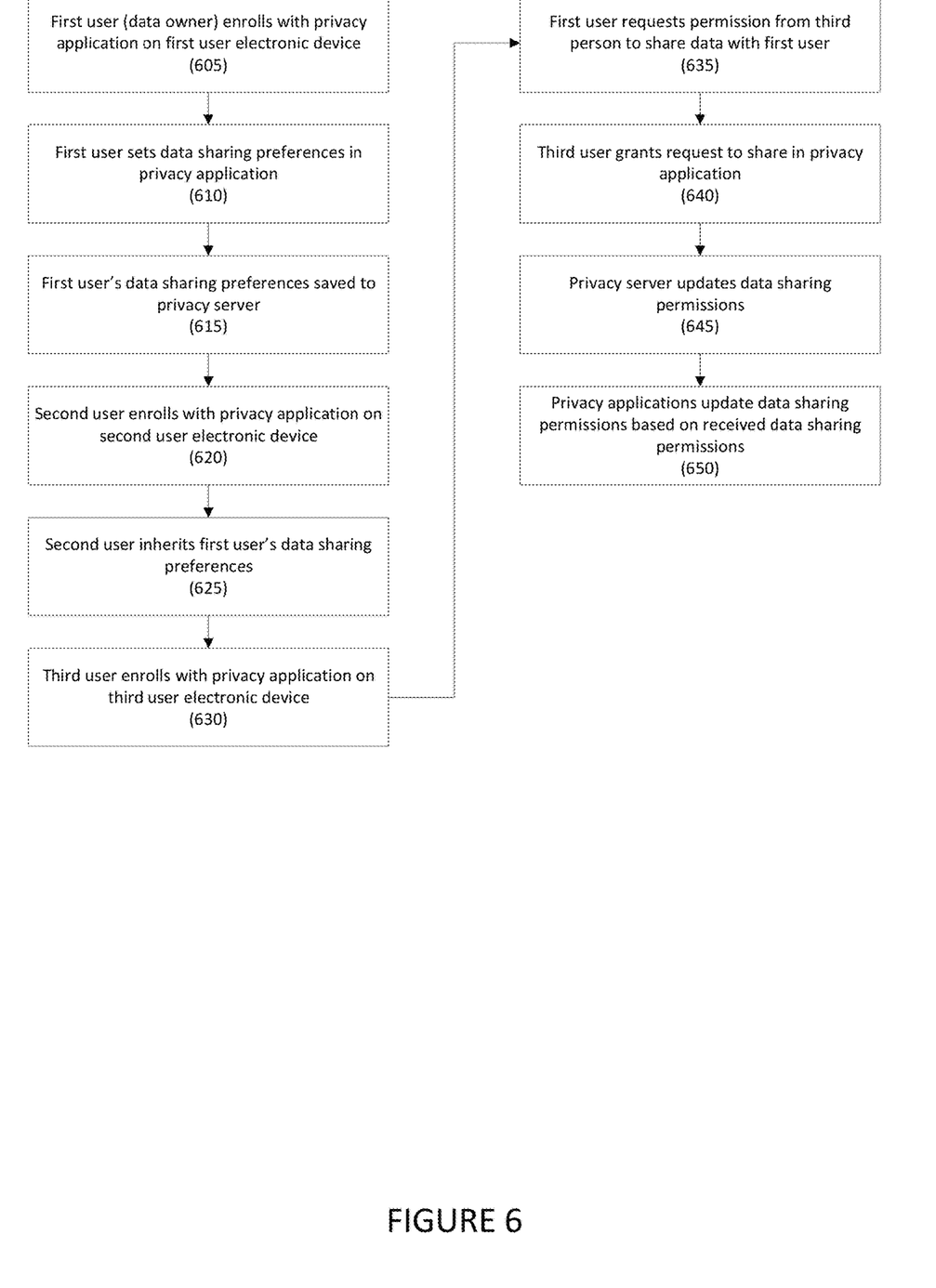
FIG. 6 depicts a method for sharing data among a plurality of users according to one embodiment.

Referring to FIG. 6, a method for sharing data among devices associated with a plurality of users is provided according to one embodiment. In step 605, a first user (e.g., a data owner) may enroll or register with a privacy application executed on a first user electronic device. In one embodiment, the user may identify the user's device(s), whether the user is the owner of the data, etc.

In one embodiment, the user may identify family members, team members, etc. with which to send invitations to share data to.

In step 610, the first user may set a data sharing preference in the privacy application. For example, the first user may identify devices, users, data, etc. that the user wishes to share with, to not share data with, services to use (e.g., VPN, device fingerprint obfuscation, whitelisting, alerts, aliasing, scoring, etc.), etc.

In step 615, the first user's data sharing preferences may be communicated to and saved with a privacy server.

In step 620, a second user may enroll with a privacy application on a second user electronic device. The second user may provide any information that is necessary and/or desired.

In step 625, the second user, who is in the first user's group, may inherit the first user's data sharing preferences.

In step 630, a third user may enroll with a privacy application on a third user electronic device. The third user may provide any information that is necessary and/or desired.

In step 635, the first user may request permission from the third user for the third user to share data with the first user. In one embodiment, the first user may make the request using the privacy application.

Alternatively, the third user may authorize sharing of data with the first user using, for example, the privacy application. In such a case, no additional permissions or authorizations are required.

In step 640, the third user may receive a notification, such as a push notification, an in-app message, etc. that the first user has requested permission, and the third user may grant or deny permission.

In step 645, if the third user grants the request, the server updates data sharing permissions as necessary.

If the third user denies the request, the data sharing permissions may not be updated (e.g., they may remain unchanged). In another embodiment, the data sharing permissions may be updated to reflect that the third user's data is not to be shared with the first user.

In step 650, the privacy server may configure the data sharing permissions for the first user and the third user and may communicate the configured data sharing permissions to the first and third devices as necessary.

In one embodiment, the device-level settings for the data sharing permissions may override user-level preferences. For example, although general preferences and/or permissions may be set for all of a user's devices, specific preferences on a device may override the general preferences and/or permissions.

In one embodiment, another user may request change of ownership from the current owner.

Any users using a device owned by someone else would inherit the privacy service and adhere to the sharing permission as set by the Owner.

The disclosures of U.S. patent application Ser. No. 16/598,734, and U.S. Provisional patent Application Ser. Nos. 62/856,491 and 62/874,240 are hereby incorporated, by reference, in their entireties.

Although multiple embodiments have been disclosed, it should be recognized that these embodiments are not exclusive to each other and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for protection of data across multiple users and devices, comprising:
 in privacy server comprising at least one computer processor:
  receiving, from a first user device, a data sharing permission for the first user device and an initial data sharing permission for a second user device, the first user device and the second user device associated with the same user;
  provisioning the data sharing permission for the second user device;
  communicating the provisioned data sharing permission to the second user device, wherein the second user device shares data with the first user device according to the provisioned data sharing permission;
  receiving, from the first user device, an updated data sharing permission for the second user device;
  determining that the updated data sharing permission for the second user device is different from the initial data sharing permission;
  in response to the determination, communicating the updated data sharing permission to the second user device;
  receiving, from the first user device, a third data sharing permission for the second user device and a third user device, the first user device and the third user device associated with the same user;
determining that the third data sharing permission does not change the updated data sharing permission for the second user device; and
communicating the third data sharing permission to the third user device and not to the second user device.

2. The method of claim 1, wherein the data sharing permission identifies a type of data to share.

3. The method of claim 2, wherein the type of data includes at least one of account data, activity data, and preference data.

4. The method of claim 1, wherein the first user device is associated with a first device key and the second user device is associated with a second device key, and the second device is identified to the privacy server by the second device key.

5. The method of claim 1, further comprising:
receiving encrypted data from the first user device or the second user device; and
storing the encrypted data in accordance with the data sharing permission.

6. The method of claim 5, further comprising:
communicating the encrypted data to the first user device or the second user device in accordance with the data sharing permission.

7. The method of claim 5, further comprising:
restoring the encrypted data to the same user device from which it originated.

8. A method for sharing data among devices associated with a plurality of users, comprising:
in privacy server comprising at least one computer processor:
receiving, from a first privacy application executed on a first electronic device, registration for a first user, wherein the registration comprises an identification of the first user device and an identification of a data owner for the data on the first user device;
receiving, from the first privacy application, data sharing preferences for the first user;
saving the data sharing preferences for the first user;
receiving, from a second privacy application executed on a second electronic device, registration for a second user, wherein the registration comprises an identification of the second user device and an identification of a data owner for the data on the second user device;
receiving, from the first privacy application, a request for the second user to share data with the first user;
communicating the request to the second privacy application;
receiving, from the second privacy application, a response to the request, wherein the response approves or denies the request;
configuring data sharing permissions for the first device and the second device;
communicating the data sharing permissions to the first privacy application and to the second privacy application, wherein at least one of the first privacy application and the second privacy application update data sharing permissions on the respective device;
receiving, from the first privacy application, updated data sharing preferences for the first user;
determining that the updated data sharing preferences alter the data sharing permissions with the second device;
in response to the determination, updating the data sharing permissions with the second device;
communicating the updated data sharing permissions to the second privacy application;
receiving, from the privacy application, a data sharing permission for the second device and a third device, the first device and the third device associated with the same user;
determining that the data sharing permission does not change the updated data sharing permissions for the second device; and
communicating the data sharing permission to the third user device and not to the second user device.

9. The method of claim 8, wherein the request for the second user to share data with the first user identifies a type of data to share.

10. The method of claim 9, wherein the type of data includes at least one of account data, activity data, and preference data.

11. The method of claim 8, further comprising:
receiving encrypted data from the first user device or the second user device; and
storing the encrypted data in accordance with the data sharing permissions.

12. The method of claim 11, further comprising:
communicating the encrypted data to the first user device or the second user device in accordance with the data sharing permissions.

13. The method of claim 8, further comprising:
receiving, from the first privacy application, second updated data sharing preferences for the first user;
determining that the updated data sharing preferences do not alter the data sharing permissions with the second device; and
in response to the determination, declining to communicate the second updated data sharing preferences to the second privacy application.

14. A method for sharing data among devices associated with a plurality of users, comprising:
in privacy server comprising at least one computer processor:
receiving, from a first privacy application executed on a first electronic device, registration for a first user, wherein the registration comprises an identification of the first user device and an identification of a data owner for the data on the first user device;
receiving, from the first privacy application, data sharing preferences for the first user;
saving the data sharing preferences for the first user;
receiving, from a second privacy application executed on a second electronic device, registration for a second user, wherein the registration comprises an identification of the second user device and an identification of a data owner for the data on the second user device;
receiving, from the second privacy application, a request for the second user to share data with the first user;
configuring data sharing permissions for the first device and the second device;
communicating the data sharing permissions to the first privacy application and to the second privacy application, wherein at least one of the first privacy application and the second privacy application update data sharing permissions on the respective device;

receiving, from the first privacy application, updated data sharing preferences for the first user;

determining that the updated data sharing preferences alter the data sharing permissions with the second device;

in response to the determination, updating the data sharing permissions with the second device;

communicating the updated data sharing permissions to the second privacy application;

receiving, from the first privacy application, a data sharing permission for the second device and a third device, the first device and the third device associated with the same first user;

determining that the data sharing permission does not change the updated data sharing permissions for the second device; and communicating the data sharing permission to the third user device and not to the second user device.

15. The method of claim 14, wherein the request for the second user to share data with the first user identifies a type of data to share.

16. The method of claim 15, wherein the type of data includes at least one of account data, activity data, and preference data.

17. The method of claim 14, further comprising:

receiving encrypted data from the first user device or the second user device; and storing the encrypted data in accordance with the data sharing permissions.

18. The method of claim 14, further comprising:

receiving, from the first privacy application, second updated data sharing preferences for the first user;

determining that the updated data sharing preferences do not alter the data sharing permissions with the second device; and in response to the determination, declining to communicate the second updated data sharing preferences to the second privacy application.

* * * * *